(12) United States Patent
Lindquist et al.

(10) Patent No.: US 6,519,644 B1
(45) Date of Patent: Feb. 11, 2003

(54) SYSTEM AND METHOD FOR DIAL-UP NETWORKING OVER INFRARED DATA LINK

(75) Inventors: Tobias Lindquist, Lund (SE); Ramon Van Der Winkel, Helsingborg (SE); Jonas Harris, Dalby (SE); Mats Tuneld, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/437,052

(22) Filed: Nov. 9, 1999

Related U.S. Application Data
(60) Provisional application No. 60/110,507, filed on Dec. 1, 1998.

(51) Int. Cl.[7] .............................................. G06F 13/00
(52) U.S. Cl. ...................... 709/227; 709/237; 709/250; 709/321
(58) Field of Search ................................. 709/217, 218, 709/219, 227, 228, 229, 232, 236, 237, 238, 313, 321, 327, 250

(56) References Cited

U.S. PATENT DOCUMENTS

| | | |
|---|---|---|
| 5,737,690 A | 4/1998 | Gutman |
| 5,781,177 A | 7/1998 | Helot et al. |
| 5,786,921 A | 7/1998 | Wang et al. |
| 5,835,862 A | 11/1998 | Nykanen et al. |
| 5,850,189 A | 12/1998 | Sakanaka et al. |
| 5,864,486 A | 1/1999 | Deming et al. |
| 5,923,443 A | * 7/1999 | Nykanen et al. ............. 358/442 |
| 5,974,238 A | * 10/1999 | Chase, Jr. .................... 709/218 |

FOREIGN PATENT DOCUMENTS

GB    2287623    9/1995

OTHER PUBLICATIONS

"Plug and Play Extensions to Link Management Protocol" Version 1.1 Infrared Data Association Jan. 8, 1996.
"'Tiny TP': A Flow–Control Mechanism for use with IrLMP" Version 1.1 Infrared Data Association Oct. 20, 1996.
"Serial Asynchronous Automatic Dialling and Control" ITU–T Recommendation V.25ter 7/97.
"IrDA Infrared Communications: An Overview" Conter-Point Systems Foundry at http://www.countersys.com/tech/overview.html 1997.
"What is IrDA Lite and When Can It Be Used?" Counter-Point Systems Foundry at http://www.countersys.com/tech/irdalite.html 1998.

(List continued on next page.)

*Primary Examiner*—Viet D. Vu
(74) *Attorney, Agent, or Firm*—Burns, Doane, Swecker & Mathis, L.L.P.

(57) ABSTRACT

A system and method for initiating a dial-up connection between a remote computing device and a network over an infrared link between the remote computer and an infrared modem is disclosed. A unique protocol defines the universe of commands, responses, and behavior of the modem regarding initialization, response sequence, and switching between data transfer mode and AT command mode.

14 Claims, 3 Drawing Sheets

OTHER PUBLICATIONS

"IrDA versus Bluetooth: A Complementary Comparison" CounterPoint Systems Foundry at http://www.countersys.com/tech/bluetooth.html 1999.

"Window Size and Throughput" CounterPoint Systems Foundry at http://www.countersys.com/tech/window.html 1999.

"Technical Summary of 'IrDA Data' and 'IrDA Control'" IrDA Standards at http://www.irda.org/standards/standards.asp 1999.

Matsumoto, M. et al. "A Cableless Connection To a Public Network Using Infrared Media For Lightweight Portable Devices", pp. 66–78, Electronics & communications In Japan, Part I—Communications, U.S., Scripta Technica, N.Y., vol. 80, No. 2, Feb., 1997, XP 000689839.

Millar I. et al. "The IRDA Standards For High–Speed Infrared Communications", pp. 10–25, Hewlett–Packard Journal, Hewlett–Packard Co., Palo Alto, vol. 49, No. 1, Feb. 1, 1998, XP000766837.

* cited by examiner

SYSTEM AND METHOD FOR DIAL-UP NETWORKING OVER INFRARED DATA LINK

RELATED APPLICATION

This application is related to, and claims priority from, U.S. Provisional Application Serial No. 60/110,507, entitled "IR NET Dial", filed on Dec. 1, 1998, the disclosure of which is expressly incorporated herein by reference.

BACKGROUND

The present invention relates to electronic communication and more particularly to electronic communication over an infrared link, and even more particularly to a system and method for establishing a dial-up connection between a remote computing device and a network over an infrared communication link between a modem with infrared communications interface (Ir modem) and the remote computing device.

The rapid proliferation of digital computing equipment coupled with users' desires to transmit data between computing devices has resulted in the rapid expansion of digital communication networks. The most visible example of this phenomenon is the internet. The growth in wireless communication, particularly in mobile phones, has made it desirable to enable mobile phones to exchange data with computing devices like personal computers. One solution to this problem has been to provide mobile phones with an Ir modem to enable the mobile phone to establish an infrared data link with a computing or communication device like a personal computer. Using an Ir modem, a mobile phone can provide wireless data transfer between a remote computing device like a personal computer and host computing device like a server connected to a conventional wireline network.

Infrared communication links are known in the art. An infrared data link transmits information using pulses of infrared light as the carrier signal. The Infrared Data Association (IrDA), an industry association, promulgated a proposed standard for establishing infrared communication links between electronic communication devices, generally referred to as the IrDA protocol. The IrDA protocol provides a multi-layered protocol stack governing communication between electronic devices over an infrared data link. The IrDA protocol stack is depicted in FIG. 1.

Physical layer 10 includes the hardware constituting the optical transceiver and specifies optical characteristics of the infrared signal. Physical layer 10 also manages the interface between components of the system implemented in hardware and the upper layer protocol layers, typically implemented in software. To do this, physical layer 10 also manages encoding of data, and framing for various communication speeds.

Ir Link Access Protocol (IrLAP) 20 corresponds to data link layer (layer 2) of the Open Systems Interconnection (OSI) protocol. IrLAP 20 is responsible for initiating and maintaining an infrared connection between two devices. Two devices connected by an IrLAP connection exist in a master-slave, or primary-secondary relationship. The primary device is responsible for all aspects of managing the connection. The primary device sends command frames to initiate a connection, to transmit data, and to terminate a connection. The secondary device sends response frames. The primary device is also responsible for controlling data flow and resolving data link errors. Once a connection is established, the IRLAP service implements retransmission, error correction and low-level flow control procedures to provide a reliable data transfer service between two connected devices.

The Ir Link Management Protocol (IrLMP) 30 service utilizes the reliable connection provided by the IRLAP layer 20 and adds multiplexing services to allow multiple IrLMP clients to transmit data across a single IrLAP link. To implement multiplexing, IrLMP 30 implements a higher level addressing scheme in which the Logical Service Access Point (LSAP) defines the point of access to a service or application. The LSAP is identified by a one byte number referred to as a LSAP Selector (LSAP-SEL). Using this higher level addressing scheme, multiple IrLMP services or applications may be multiplexed over a single IrLAP connection.

The Tiny Transport Protocol (TinyTP) 40 is a transport layer service that provides flow control for each IrLMP connection and also performs segmentation and reassembly (SAR). Flow control is provided using a credit-based flow control scheme in which the devices transmit credit packets indicating how many IrLMP packets they can receive.

The IrDA protocol provides three optional services: Ir Object Exchange (IrOBEX) 60, Ir Local Area Network (IrLAN) 50 and Ir Serial and Parallel Port Emulation (IrCOMM) 70. IrOBEX 60 is an application layer protocol that provides a simple, compact data exchange service. IrLAN 50 is an application layer protocol that emulates a LAN connection. Finally, IrCOMM 70 is an application layer protocol that emulates communication over a parallel or serial communication port.

An Ir modem requires two additional layers residing logically above the IrCOMM layer 70 to communicate with a remote computing device (e.g., a personal computer (PC) or personal digital assistant (PDA)): the AT Parser layer 90 and the Data Transfer layer 95. The AT Parser 90 accepts commands from applications running on the remote computing device. The commands are executed and a final response is sent back, optionally preceded by one or more intermediate responses. It will be noted that in normal operation, an application running on the remote computing device generates a single AT command and waits for a response. The AT Parser 90 may also generate unsolicited responses that are sent to the application at any time during execution of commands, but more likely during the execution of two AT commands, or when the application is idle. Unsolicited commands may be used by the modem to get the attention of the application when an incoming call has been detected.

AT commands are a generic method of commanding a modem and receiving responses. Standardized AT commands are detailed in International Telecommunications Union Standard ITU-T V.25 ter. In addition to standardized commands, each manufacturer can establish proprietary commands. The application must therefore know the type of modem with which it is communicating so it can issue the correct commands to configure the modem. By way of example, the Microsoft® Windows® operating system has hundreds of modem descriptions, each with their own set of commands that are needed to make sure the modem operates properly.

The Data Transfer layer 95 is active when a call is connected and performs the transport of the data to and from the remote modem. When the Data Transfer layer 95 is active, the AT parser 90 is inactive. The transition from the AT parser 90 mode to the Data Transfer layer 95 mode (e.g., data mode) is made after either the ATD or ATA commands have completed execution and the call is connected. Transition from data mode back to AT parser mode is required before the modem can be commanded to disconnect the call. For this, one of several industry standards can be implemented by the modem manufacturers. The transition can be initiated either by in-band signalling or out-of-band signalling using the V.24 pin DTR. In-band signalling is called the "escape sequence" and consists of a pattern of characters.

The escape sequence usually consists of three plus characters in sequence ("+++"), sometimes with a required delay either before or after the sequence, or both. The escape character is configurable using an AT command. Some escape sequences must be followed by a valid AT command before it is accepted by the modem. When the transition is made, the modem sends the final result code "OK" to the application.

The IrCOMM entity is, in some implementations, exposed to the applications as a COMM-port, so the application does not require special support for IrDA to operate with, for example, an IR modem. This is called a "Virtual COMM-port". When the application connects to this virtual COMM-port, most known IR stack implementations lock the entire IR stack. This means that other applications and protocols like OBEX over IR cannot be operative while IrCOMM is used.

Finally, the IrDA Information Access Service (IAS) 80 acts as the "yellow pages" for a device. The IAS uses a client-server model in which client objects make requests about the services available on a particular device, and the server accesses an information base of objects supplied by local services or applications to respond to the request. An IAS object is represented by a data structure having a Class Name and up to 256 Named Attributes.

Presently, IrDA-compatible infrared communication links between an Ir modem and computing devices are established using the IrCOMM application layer service. IrCOMM includes a control channel that can be used to separate control signaling from data transfer. However, because IrCOMM was designed to emulate a serial or parallel communication port, it is poorly adapted for establishing connections between mobile phones and computing devices. For example, IrCOMM lacks a feature for initializing an Ir modem to start a communication session. In the absence of an initialization feature, this function must be addressed by higher level application software. Accordingly, there is a need in the art for a compact, yet robust system and method for establishing an infrared connection between an Ir modem and a remote communication device.

SUMMARY OF THE INVENTION

The present invention addresses these and other concerns by providing an alternate service for providing a connection between a computing device and an IR modem over an infrared communication link. The service is referred to herein as the IrNetDial protocol, or service. The IrNetDial service may be added to the IrDA protocol stack in conjunction with IrLAN, OBEX, and IrCOMM and is exposed to the application through the IAS. IrNetDial defines the initial state of the modem, thereby removing the need for initialization, and provides a strictly limited set of supported AT commands and responses. Further, IrNetDial provides a defined method for switching from data mode to AT parser mode. These features simplify the application that sets up the data connection, improve reliability, and remove the need for a description of the specific modem listing the AT commands valid for the modem in use. IrNetDial encourages ad-hoc networking since the modem configuration does not have to be installed from a removable media; instead, the Ir Modem with IrNetDial can be used at once.

The present invention addresses these and other needs by providing, in one aspect, a method of initiating, in a remote computing device, a request to establish a dial-up connection with a network over an infrared communication link between the remote communication device and an Ir modem. The method comprises the steps of querying the LMP_IAS to obtain the LSAP-SEL for the infrared communication link, establishing a logical connection to an IrDA TinyTP LSAP returned by the LMP_IAS query, and executing an ATD command to initiate a dial-up connection between the remote computing device and the network over the infrared link between the remote computing device and the Ir modem.

In another embodiment, the invention provides a method of receiving, in a remote computing device, a request to establish a dial-up connection with a network over an Ir communication link between the remote computing device and an Ir modem. The invention comprises the steps of querying an IrDA LMP_IAS to obtain the LSAP-SEL for the infrared connection, establishing a logical connection to an IrDA TinyTP LSAP returned by the LMP_IAS query, and executing an ATA command to answer the request for a dial-up connection between the remote computing device and the network over the infrared link between the remote computing device and the Ir modem.

In further embodiments of the invention, an initiation string is transmitted to the Ir modem.

In further embodiments of the invention, data is transmitting between the remote computing device and the Ir modem.

In further embodiments of the invention, the communication session is terminated by transmitting an ATH command to the Ir modem.

In another aspect, the invention provides a system for establishing a dial-up connection between a remote computing device and network over an infrared communication link between the remote computing device and an infrared modem. The system comprises means for querying a LMP_IAS to obtain a LSAP-SEL for the infrared connection, means for establishing a logical connection to an IrDA TinyTP LSAP returned by the LMP_IAS query, and means for executing an ATA command to initiate a dial-up connection between the remote computing device and the network over the infrared link between the remote computing device and the Ir modem.

BRIEF DESCRIPTION OF THE DRAWINGS

These, and other objects, features and advantages of the present invention will become more readily apparent to those skilled in the art upon reading the following detailed description, in conjunction with the appended drawings, in which.

DETAILED DESCRIPTION OF THE INVENTION

The present invention provides a system and method for establishing an infrared communication link between an Ir modem and a communication or computing device. In a preferred embodiment, the present invention provides the ability to set up and facilitate a wireless dial-up connection between a remote computing device and a network. Data is transferred over an infrared link between the remote computing device and the Ir modem.

1. Network Architecture

Figure 1:
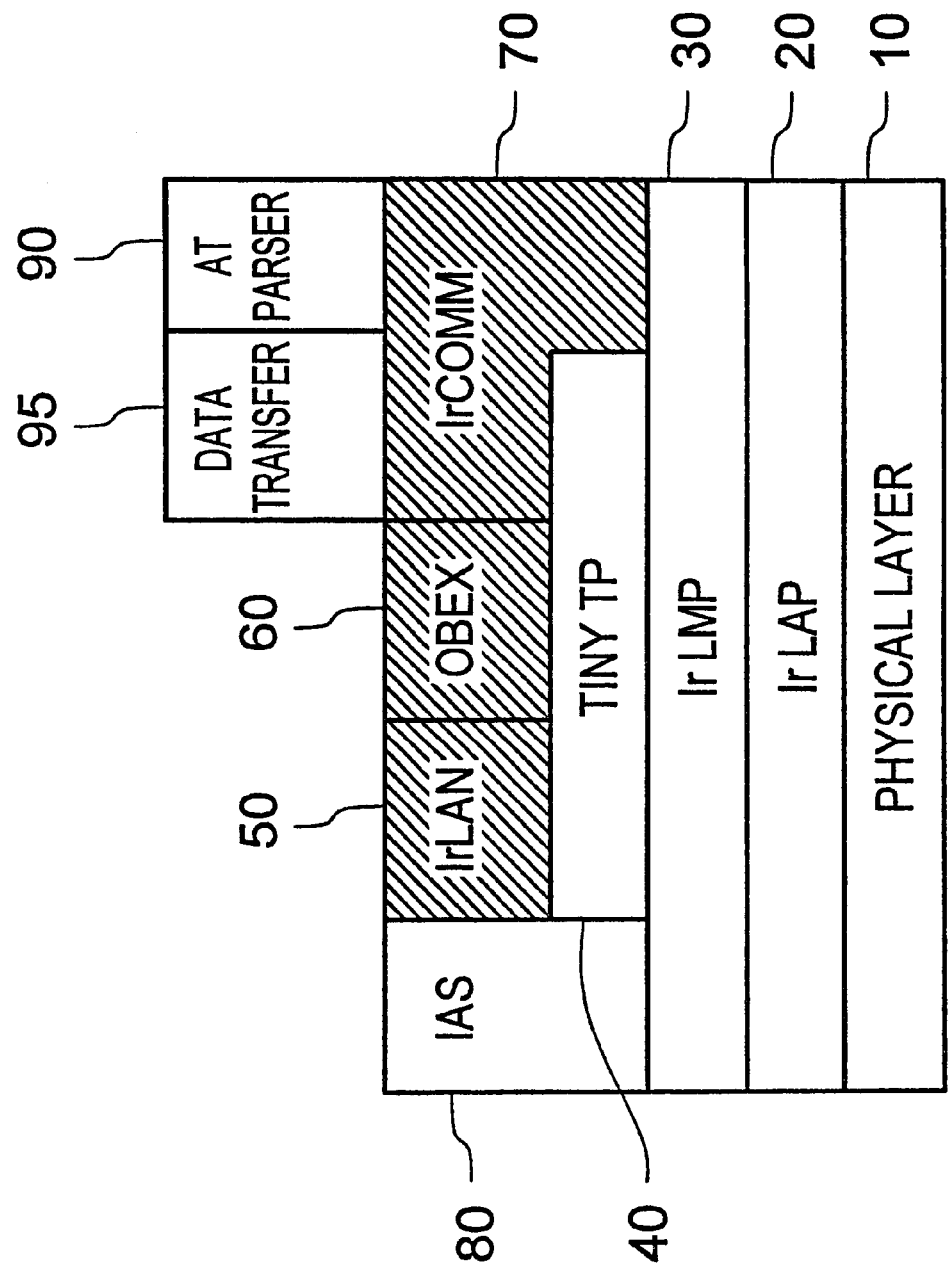
FIG. 1 is a schematic depiction of the IrDA protocol stack.
Figure 2:
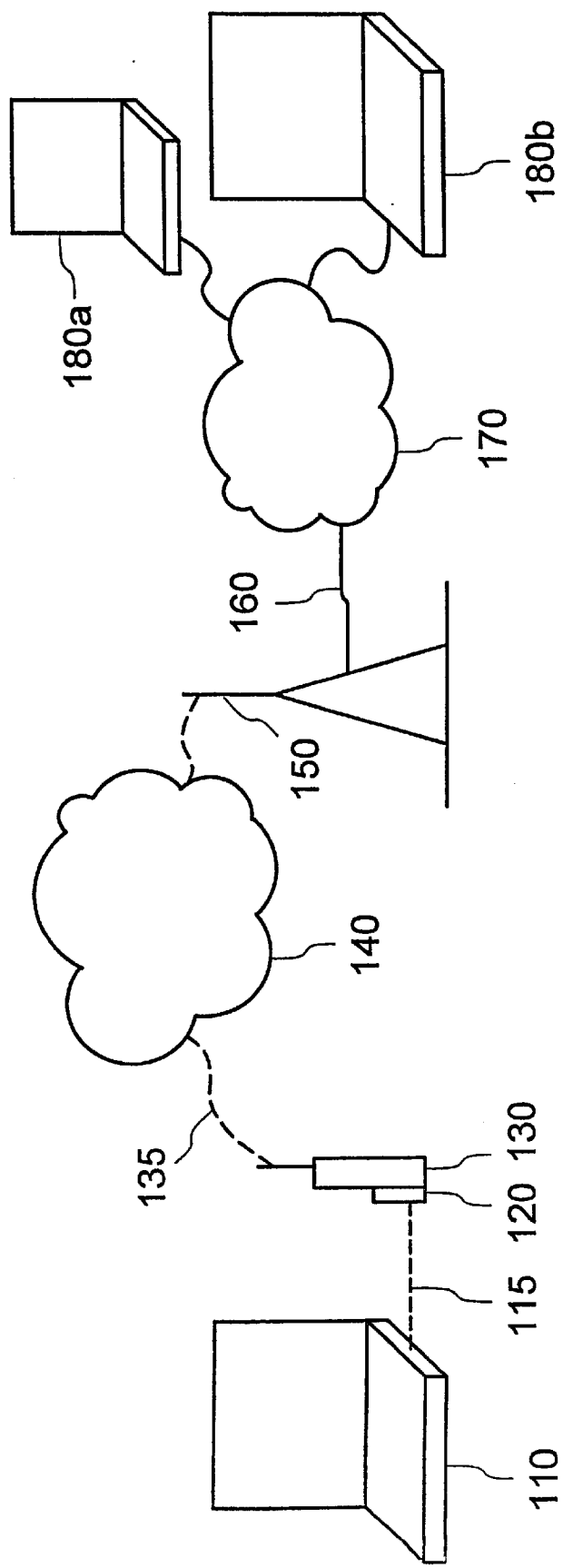
FIG. 2 is a schematic depiction of a communication system according to the present invention.

FIG. 2 presents a network architecture for dial-up networking implemented according to one embodiment of the present invention. Referring to FIG. 2, there is illustrated a remote computing device 110 connected to an Ir modem 120 by infrared communication link 115. Ir modem 120 is connected to a mobile telephone 130 which establishes a wireless link 135 to a mobile communication network 140. A base station 150 receives wireless signals from mobile communication network 140 and transmits the signals across a wireline link 160 through a wireline network 170, to host computing devices 180a and/or 180b. A network architecture according to FIG. 2 allows a user of remote computing device 110 to use mobile communication network 140 to establish a data connection with more traditional wireline computer networks or network devices.

In one embodiment, remote computing device 110 may be embodied in a personal computer having an infrared communication port. Infrared communication ports are standard interfaces on many portable personal computers. By way of example, the Dell® Inspiron® line of portable personal computers, commercially available from Dell Computer Corporation, Round Rock, Tex., USA includes an IrDA 1.1 compatible serial infrared communication port. It will be appreciated that remote computing device 110 may be embodied as any computing device having an infrared communication port including, but not limited to, personal computers and personal digital assistants.

In one embodiment Ir modem 120 may be integrated into mobile phone 130. An exemplary mobile phone including an integrated Ir modem is the Ericsson® model CF-888 commercially available from Ericsson. Preferably, Ir modem 120 is IrDA compliant. It will be appreciated that Ir modem 120 could be separate from mobile phone 130. According to the invention, Ir modem 120 can operate in two different modes: an offline command mode and an online data mode. Communication sessions are started with Ir modem 120 in an offline command mode, in which there is no call established over mobile phone 130 and Ir modem 120 is waiting for instructions. When a communication session is established and a call is connected, Ir modem 120 switches to an online data mode in which the modem can transmit and receive data. In the online data mode, the only control instruction Ir modem 120 can act upon is an instruction that terminates the connection, as discussed below.

2. Data Architecture

The present invention is particularly concerned with establishing a dial-up connection over the infrared communication link 115 between remote computing device 110 and Ir modem 120. As depicted in FIG. 2, infrared modem 120 is preferably integrated with or connected to mobile telephone 130 to enable remote computing device 110 to establish a wireless network connection.

Figure 3:
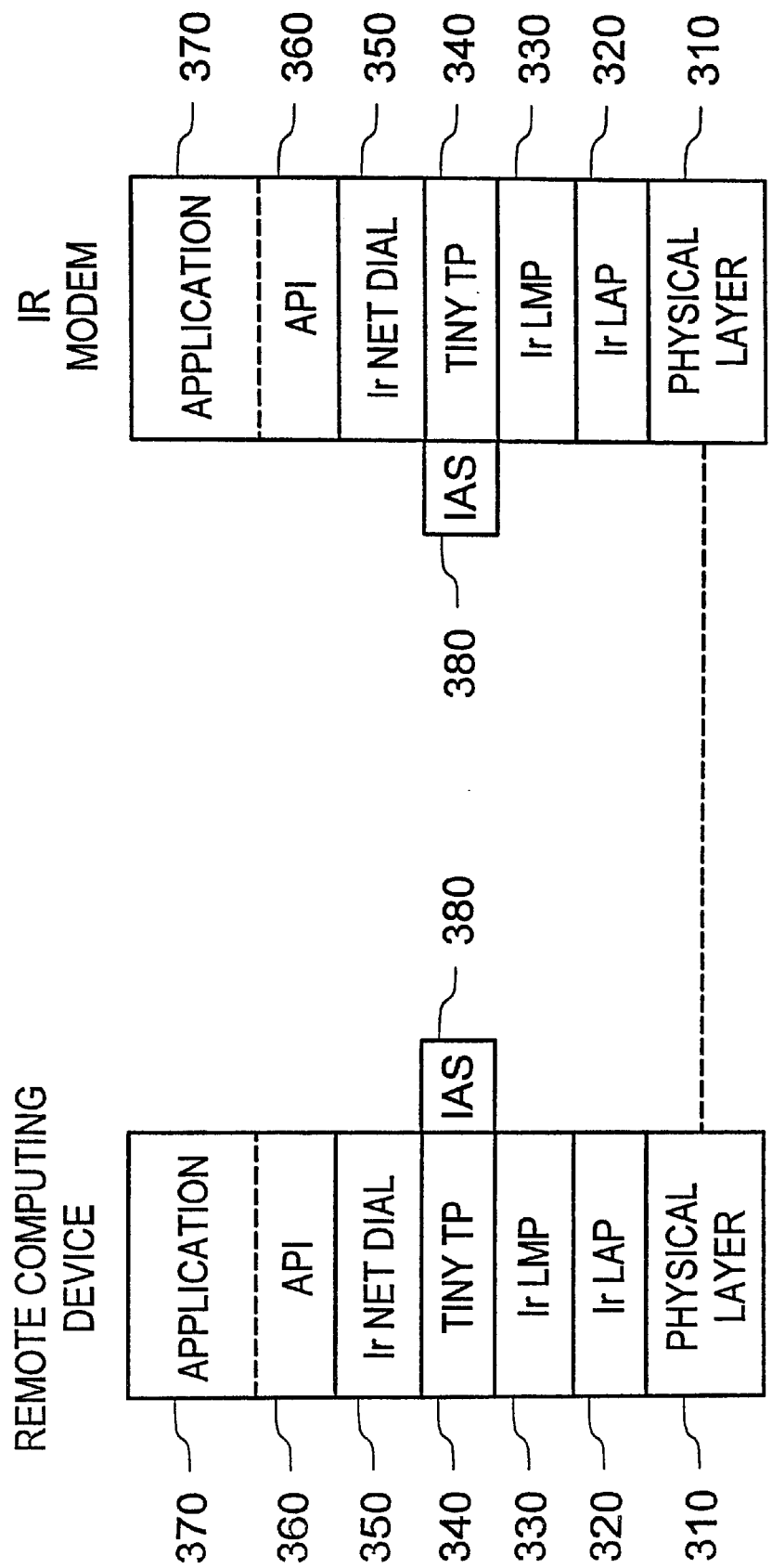
FIG. 3 is a schematic depiction of a protocol stack according to the present invention.

FIG. 3 presents a schematic depiction of the protocol stacks that govern data transmission over infrared communication link 115 according to the present invention. The present invention provides a compact, robust procedure for establishing and maintaining a data connection over infrared communication link 115 using an IrDA TinyTP connection. To accomplish this, the present invention provides a service, referred to herein as IrNetDial, for establishing a data connection between a remote computing device and an infrared modem. Referring to FIG. 3, IrNetDial 350 is an optional IrDA protocol that uses the services of the lower-layer protocols (e.g., TinyTP 340, IrLMP 330, IrLAP 320, Physical Layer 310), which are preferably IrDA compliant.

According to the present invention, user applications 370 (e.g., e-mail, file transfer applications, etc.) on remote computing device 110 pass data to the IrNetDial 350 service through an application programming interface (API) 360. The IrNetDial service manages the process of setting up the dial-up connection, initializing the modem, if necessary, and terminating the dial-up connection when the session is finished. Advantageously, IrNetDial manages the connection process using a limited subset of commands from the ITU-T Rec. V.25 ter (July 1997) SERIAL ASYNCHRONOUS AUTOMATIC DIALING AND CONTROL, which is incorporated by reference herein.

3. V.25 ter Command Options

In a preferred embodiment, the present invention implements a limited subset of the V.25ter AT commands. These commands are transmitted in TinyTP frames. Pursuant to the V.25ter standard, the Ir modem echoes the command back to the host communication device and provides one or more responses to the AT command. Multiple commands may be transmitted in a single TinyTP frame, but a single command may not be split between TinyTP frames. By contrast, echoes and responses may be split between TinyTP frames.

The present invention follows the rules set forth in the V.25ter standard for separating AT commands. All AT commands are terminated with a <CR>. The echoed command also terminates with a <CR>. Responses from the Ir modem are of the form <CR><LF>Response<CR><LF>. Thus, each AT command issued results in the following transmission sequence between the host communication device and the Ir modem. It will be noted that one or more response codes may be returned in response to every command. In the following exemplary command sequence, it will be noted that <CR> is, by default, the character with the decimal number 13 and <LF> is the character with the decimal number 10.

TABLE 1

Exemplary Command Sequence

| Direction | Content | Format |
| --- | --- | --- |
| PC→Modem | Command | AT . . . <CR> |
| PC←Modem | Echo | AT . . . <CR> |
| PC←Modem | Response<br><CR><LF>Response<CR><LF> | |
| PC←Modem | Response (possible)<br><CR><LF>Response<CR><LF> | |

The present invention implements the following commands for the V.25ter protocol. The commands are presented as a character string, followed by a verbal description of the command.

Comments a. Link Control Commands

ATD, Dial
Description:
Initiate a data call. The phone number used to establish the connection will
consist of digits and modifiers or a stored number specification. An abortion of the operation can be made by sending any character during ATD connection before CONNECT is received.

-continued

| | | Comments |
|---|---|---|
| Execute command: | D<n> | Dial the phone number specified in the command as <n>. |
| Dial examples: | ATD+4646120345 | See below for possible responses. |
| Response codes: | CONNECT<speed> | Data connection established at the rate given in <speed>. This puts the modem into Online Data Mode. |
| | NO CARRIER | Unable to establish a connection or the connection attempt was aborted. The modem remains in Offline Command Mode. |
| | ERROR | An unexpected error occurred while trying to establish the connection. The modem remains in Offline Command Mode. |
| | NO DIALTONE | The mobile phone is being used for a voice call or is not within coverage of the network. The modem remains in Offline Command Mode. |
| | BUSY | The called phone number is engaged. The modem remains in Offline Command Mode. |

ATH, Hook control

Description:
Terminates a connection.

| Execute command: | H | |
|---|---|---|
| Response code: | NO CARRIER | Connection terminated. Modem goes from Online Command Mode to Offline Command Mode. |
| | OK | This is returned if already in Offline Command Mode. |
| | ERROR | Unexpected error. |

ATA, Answer

Description:
Answers an incoming data call. To Receive an incoming data call the modem has to be IrDA connected and in offline command mode. If there is an incoming call the modem will send an unsolicited result code in the form <CR><LF>RING<CR><LF>. It is then possible to answer by using ATA.

| Execute command: | A | Answers and initiates connection to an incoming call. |
|---|---|---|
| Examples: | ATA | |
| Response code: | CONNECT<speed> | Data connection established at the rate given in <speed>. |
| | ERROR | This is returned if not a data call, or if no call at all. | b. Initiation Commands

AT+DS Data Compression Mode
Description:
Defines the compression parameters and negotiation used for V.42 bis compression specified in ITU-T Recommendation, Data Compression Procedures for Data Circuit Terminating Equipment (DCE) Using Error Correction Procedures.
Set command: +DS=[<dir>,[<neg>,[<md>,[<ms>]]]]

| <dir> | 0 | Disable V.42bis compression |
|---|---|---|
| | 1 | Enable V.42bis compression on transmitted data |
| | 2 | Enable V.42bis compression on received data |
| | 3 | Enable V.42bis compression on received and transmitted data. Default = 3. |

-continued

| | | Comments |
|---|---|---|
| <neg> | 0 | Connect even if the compression protocol does not comply with that specified by dir. |
| | 1 | Disconnect if compression protocol does not comply with dir. Default = 0. |
| <md> | 512-4096 | Defines the maximum dictionary size. This value will be amended automatically to comply with any memory constraints. Default = 2048 bytes. |
| <ms> | 6,250 | Defines the maximum string length. Default = 32 bytes. |

4. Initiation String and Default Settings

The Ir modem must be initialized before opening a communication session. A modem manufacturer may specify a default initiation setting. An exemplary default setting of an IrModem may be specified in accordance with ITU-T Recommendation V.25, ter, as follows.

| | |
|---|---|
| Echo | ON, EI |
| Results | Verbose, V1 |
| Result code suppression | OFF, QØ |
| Esc. Character | ="+", S2=43, |
| Enter (CR) | =dec. symbol # 13, S3=13 |
| Linefeed (LF) | =dec. symbol # 10, S4=10 |
| V.42bis compression | Enabled on received and transmitted data, always negotiate, max dictionary size 2048, string length 32. |

Provided the user is willing to accept the default settings, no special initialization instruction by the PC are necessary when opening an IrNETDial connection. The IrModem preferably includes means for initializing itself when an infrared connection is opened. Such means may be embodied as logic instructions operating on a suitable microprocessor. However, the remote computing device may turn compression on and off.

To enable future expanded capabilities in the modem, each modem vendor can provide an initiation string for use with its modem. The initiation string contains AT commands configuring the modem in a desired way for dial-up networking. The PC must, before dial-up, send the initiation string to the modem. This string could be automatically stored in a memory location associated with the PC when the modem is installed. By using the phone Plug n'Play number read by IrDA_IAS request, a control that the right modem is installed can be made. It may also be displayed in the modem configuration menu so it can be edited manually. In a preferred embodiment, the string format is as follows:

Each command in the string should be written using only the set command itself (i.e., without the characters AT in format).

The character <CR> shall NOT be included after each command.

Each command shall be separated by a semicolon (;).

EXAMPLE

Ir Modem Initiation String

+XTRA=1,5;+NEW=3

5. Operation

A dial-up connection may be established over the infrared link between the remote computing device and the Ir modem pursuant to the following procedures: referring to FIG. 2, when remote computing device 110 initiates an outgoing call, a processor in the remote computing device 110 queries the IrDA LMP-IAS to obtain the LSAP-SEL for the connection and establishes a logical connection to the IrDA Tiny TP LSAP-SEL returned by the IAS query. Ir modem 120 is initialized for dial-up services. Ir modem 120 may be self-initialized or an initiation string may be transmitted with extra setting, if existing, from remote computing device 110 to the Ir modem 120. Remote computing device 110 establishes a dial-up connection by transmitting an ATD command with the desired destination phone number. When destination device (e.g. 180a, 180b) answers, remote computing device 110 and Ir modem 120 exchange data pursuant to existing IrDA procedures, and the data may be transmitted to destination device 180a, 180b. Remote computing device 120 may end the telecommunication session by sending an escape sequence (e.g., +++) and an ATH command. The IR communication session may then be disconnected.

A slightly modified process applies when remote computing device 110 receives an incoming call through Ir modem 120. In this case, an application on remote computing device 110 typically initiates the infrared link between remote computing device 110 and Ir modem 120 and waits for an incoming call, which is indicated by the IR modem sending the unsolicited code "RING" to the application. The infrared connection is then established in substantially the same manner. Remote computing device 110 queries the LMP-IAS 380 to obtain the LSAP-SEL for the connection and establishes a logical connection to the IrDA Tiny TP LSAP-SEL returned by the IAS query. Ir modem 120 is initialized for dial-up services. Ir modem 120 is self-initialized, but an initiation string may be transmitted with extra settings, if existing, from remote computer 110. When Ir modem 120 receives an incoming call, Ir modem 120 transmits a ring indication in the form of an unsolicited result code in the following format: <CR><LF>RING<CR><LF>. Remote computing device 110 answers the call using the ATA command. Data may then be exchanged pursuant to existing IrDA procedures. Remote computing device 110 may end the telecommunication session by sending an escape sequence (e.g. +++) and an ATH command. The IR communication session may then be disconnected.

It will be noted that if the call is terminated for some reason, Ir modem 120 sends an unsolicited response <CR><LF>NO CARRIER<CR><LF>. Similarly, if the infrared connection for some reason is obstructed or interrupted, the general IrDA rules shall be followed with a timeout. If the infrared connection is then terminated, Ir modem 120 will, in turn, terminate the connection.

6. IAS and Hint Bits

To implement this service a new Class Name must be added to the LMP_IAS. The invention may be implemented by adding a new Class Name IrModem to the LMP_IAS. The Class Name IrModem has the attributes IrDA:TinyTP:LSAP-SEL. The correct LSAP-SEL may be retrieved by performing an LMP_IAS GetValueByClass query on the IrModem Class Name. IAS queries are defined in IrDA protocol.

To give the proper service hints in the device information field, the hint bit for the modem is set so that it is possible make an early detection of this service in an IrDA connection. A hint bit is a bit that indicates which services are included in the Ir device. The hint bit can be used by the Ir stack to determine whether the device has the services requested by the application before the higher level IrDA protocols connect to the device. Hint bits are discussed in the IrDA protocol.

The present invention has been described with reference to particular embodiments. It will be understood that the claims are not limited to the particular embodiments described herein, but should be construed to cover structural equivalents and modifications consistent with the ordinary skill in the art.

What is claimed is:

1. A method of initiating, in a remote computing device, a request to establish a dial-up connection with a network over an infrared communication link between the remote computing device and an Ir modem, comprising the steps of:

querying a LMP_IAS to obtain a LSAP-SEL for the infrared communication link;

establishing a logical connection to an IrDA TinyTP LSAP returned by the LMP_IAS query; and executing an ATD command to initiate a dial-up connection between the remote computing device and the network over the infrared communication link between the remote computing device and the Ir modem.

2. A method according to claim 1, further comprising the step of:

transmitting an initiation string to the Ir modem.

3. A method according to claim 1, further comprising the step of:

transmitting data between the remote computing device and the Ir modem.

4. A method according to claim 1, further comprising the step of:

terminating the dial-up connection by transmitting an ATH command to the Ir modem.

5. A method according to claim 1, further comprising the step of:

terminating the infrared communication session.

6. A method of receiving, in a remote computing device, a request to establish a dial-up connection with a network over an infrared communication link between the remote computing device and an Ir modem, comprising the steps of:

querying a LMP_IAS to obtain a LSAP-SEL for the infrared communication link;

establishing a logical connection to an IrDA TinyTP LSAP returned by the LMP_IAS query; and executing an ATA command to answer the request for a dial-up connection between the remote computing device and the network over the infrared communication link between the remote computing device and the Ir modem.

7. A method according to claim 6, further comprising the step of:

transmitting an initiation string to the Ir modem.

8. A method according to claim 6, further comprising the step of:

transmitting data between the remote computing device and the Ir modem.

9. A method according to claim 6, further comprising the step of:

terminating the dial-up connection by transmitting an ATH command to the Ir modem.

10. A method according to claim 6, further comprising the step of:

terminating the infrared communication session.

11. A system for establishing a dial-up connection between a remote computing device and network over an infrared communication link between the remote computing device and an infrared modem, comprising:

means for querying a LMP_IAS to obtain a LSAP-SEL for the infrared communication link;

means for establishing a logical connection to an IrDA TinyTP LSAP returned by the LMP_IAS query; and means for executing an ATD command to initiate a dial-up connection between the remote computing device and the network over the infrared link between the remote computing device and the Ir modem.

12. A system according to claim 11, wherein:

the means for querying the LMP-IAS comprises software operational on a processor associated with the remote computing device.

13. A system according to claim 11, wherein:

the Ir modem is integrated into a mobile telephone.

14. A system according to claim 11, wherein:

the Ir modem is a separate component attachable to a mobile telephone.

* * * * *

UNITED STATES PATENT AND TRADEMARK OFFICE
CERTIFICATE OF CORRECTION

PATENT NO. : 6,519,644 B1
DATED : February 11, 2003
INVENTOR(S) : Alper Ilkbahar, Harry Muljono and Pablo M. Rodriguez It is certified that error appears in the above-identified patent and that said Letters Patent is hereby corrected as shown below:

<u>Title page,</u>
Item [75], Inventors, please correct the spelling of the inventors names as follows:
-- Alper Ilkbahar, Harry Muljono, and Pablo M. Rodriguez. --

Signed and Sealed this

Third Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,519,644 B1
DATED : February 11, 2003
INVENTOR(S) : Tobias Lindquist et al.

It is certified that error appears in the above-identified patent and that said Letters Patent is hereby corrected as shown below:

This certificate supersedes Certificate of Correction issued February 3, 2004, the number was erroneously mentioned and should be vacated since no Certificate of Correction was granted.

Signed and Sealed this

Sixth Day of April, 2004

JON W. DUDAS
*Acting Director of the United States Patent and Trademark Office*